(12) United States Patent
Thucanakkenpalayam Sundararajan (10) Patent No.: US 12,026,094 B2
(45) Date of Patent: Jul. 2, 2024

(54) VARIED VALIDITY BIT PLACEMENT IN TAG BITS OF A MEMORY

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 2 days.

(21) Appl. No.: 17/974,888

(22) Filed: Oct. 27, 2022

(65) Prior Publication Data

US 2024/0143503 A1 May 2, 2024

(51) Int. Cl.
*G06F 12/08* (2016.01)
*G06F 12/0802* (2016.01)

(52) U.S. Cl.
CPC .. *G06F 12/0802* (2013.01); *G06F 2212/1024* (2013.01)

(58) Field of Classification Search
CPC ................. G06F 12/0802; G06F 2212/1024
See application file for complete search history.

(56) References Cited

U.S. PATENT DOCUMENTS

2009/0064122 A1* 3/2009 Bielski ................. G06F 8/65
711/216

* cited by examiner

*Primary Examiner* — Jae U Yu
(74) *Attorney, Agent, or Firm* — Patterson + Sheridan, LLP (57) ABSTRACT

A system and method access memory blocks in a memory by receiving a memory transaction request from a processing device. First hash bits of the memory transaction request are compared with second hash bits of a first memory block of a memory. Data associated with the first memory block is output to the processing device based on the comparison of the first hash bits with the second hash bits.

20 Claims, 7 Drawing Sheets

VARIED VALIDITY BIT PLACEMENT IN TAG BITS OF A MEMORY

TECHNICAL FIELD

The present disclosure generally relates to a processor system. In particular, the present disclosure relates to the placement of validity bits within the tag bits of entries within a memory.

BACKGROUND

Memories store data within memory blocks. The data is stored along with metadata, which is used to respond to memory transactions received from a processor. A memory may be a cache memory that stores data requested by the processor from a primary memory. The cache memory receives a memory transaction request from the processor, and determines whether or not the requested data is stored within the cache memory. If the requested data is stored within the cache memory, the cache memory responds accordingly. If the requested data is not stored within the cache memory, the data is requested from the primary memory.

SUMMARY

In one example, a method includes receiving a memory transaction request from a processing device. Further, the method includes comparing, via control circuitry, first hash bits of the memory transaction request with second hash bits of a first memory block of a memory. The method further includes outputting data associated with the first memory block based on the comparison of the first hash bits with the second hash bits to the processing device.

In one example, a system includes a processing device, and a memory. The memory includes memory blocks. The memory receives a memory transaction request from the processing device, and compares first hash bits of the memory transaction with second hash bits of a first memory block of a memory. The memory outputs data associated with the first memory block based on the comparison of the first hash bits with the second hash bits to the processing device.

In one example, a memory includes memory blocks, and control circuitry. The control circuitry obtains data from a primary memory. The data is associated with an address. The control circuitry determines a hash value from first hash bits of the address, and sets a validity bit within tag bits of the address to a valid value. A position of the validity bit corresponds to the hash value. Further, the control circuitry stores the data within a first memory block of the memory blocks.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to varied validity bit placement in tag bits of a memory.

In a processing system, as data is requested from a primary memory by a processor, the data is stored within a cache memory. As compared to the primary memory, the cache memory has faster response time than the primary memory. A processor first provides a memory transaction request to the cache memory to determine whether or not the requested data is stored within the cache memory. If the data is stored in the cache memory, the data is provided from the cache memory to the processor. However, as the cache memory is smaller than the primary memory and stores data from the primary memory based on requests made by the processor, not all data within the primary memory is included within the cache memory. Data that is determined to not be within the cache memory is requested from the primary memory and used to respond to the memory transaction request.

When the cache memory receives a memory transaction request, the cache memory searches the contents of the cache memory to determine whether or not the requested data is stored within the cache memory. The data stored within the cache memory is stored within memory blocks. Each the memory blocks is associated with respective metadata that identifies whether or not the data (or entry) within the memory block is valid. Further, the metadata includes tag bits (or a tag field). The tag bits are the higher-order bits of the address of the data. In other examples, other bits of the address may be used as the tag bits. The tag bits function as a prefix for the data stored in the corresponding memory block within the cache memory. The tag bits allow for a memory block within the cache memory to track wherein the primary memory the data came from, as the tag bits indicate which subset of the primary memory is stored within the corresponding memory block.

When determining whether or not the data of a memory transaction is stored within the cache memory, the tag bits of the memory transaction are compared against the tag bits of each memory block that is determined to be valid (e.g., have valid data). If none of the valid memory blocks have matching tag bits, the cache memory is determined to not contain the data of the memory transaction, and the memory transaction request is sent to the primary memory. Based on a determination that there is a match between one of the tag bits of a valid memory block and the tag bits of the memory transaction, the data within the valid memory block is provided to the processor in response to the memory transaction.

As the tag bits of each valid memory block is compared to the validity bits of the memory transaction, the process of determining whether or not a cache memory includes the data of the memory transaction is processor resource and processing time intensive. Accordingly, the response time of the cache memory is increased, reducing the performance of the corresponding processing system.

As is described in greater detail in the following, the position of the validity bits for entries within a memory are varied based on hash bits of the address for the entries. A hash value is determined from the hash bits and is use dot determine the position of a respective validity bit. The hash bits and the validity bit are used to identity data associated with a memory transaction request within the memory.

The present disclosure describes a memory that utilizes hash bits within the tag bits of the memory blocks to determine the location of the validity bit for each memory block. When data is stored within the memory, one or more tag bits are selected to be used as the hash bits. The hash value is determined from the hash bits, and the validity bit is stored within the tag bits at a bit position that corresponds to the hash value. The tag bits used as the hash bits are maintained within control circuitry of the memory, and as the position of the validity bit varies from memory block to memory block, the security of the memory is increased. The hash bits are further used to determine whether or not the memory includes the requested data of a memory transaction.

Technical advantages of the present disclosure include, but are not limited to, a reduction in the response times of the memory, and the corresponding processor resources and processing time used to determine whether or not the memory includes the requested data.

Figure 1:
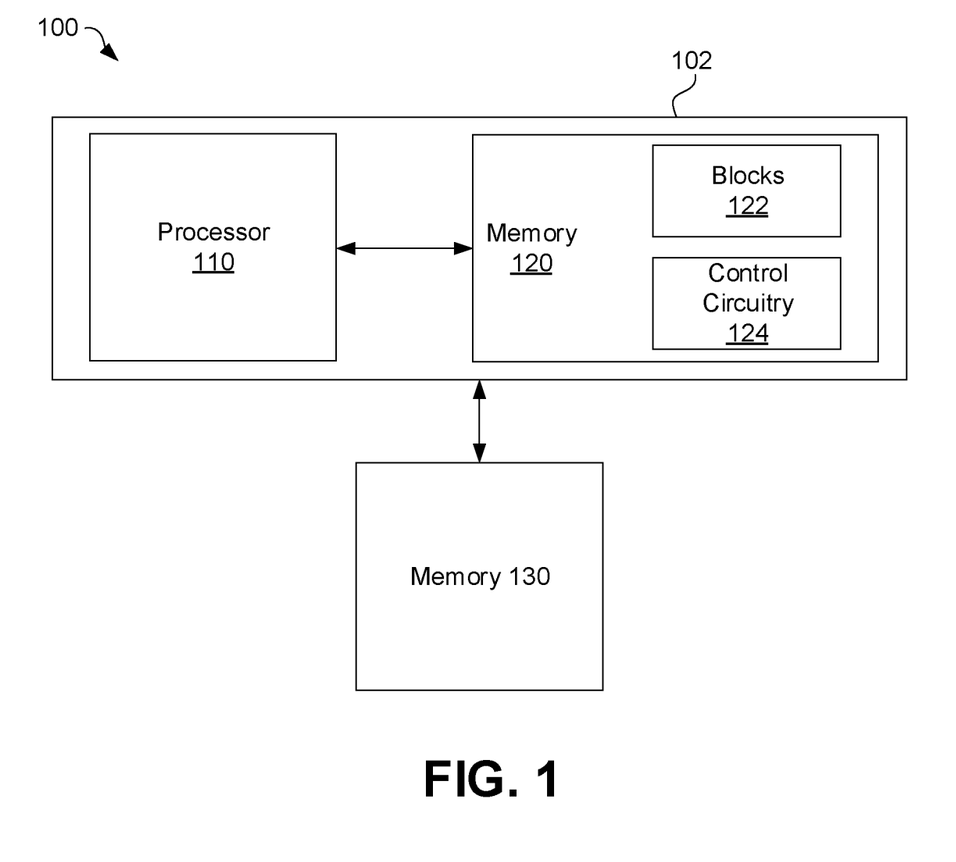
FIG. 1 illustrates a block diagram of a processing system, according to one embodiment.

FIG. 1 illustrates schematic block diagram of a processing system 100, according to one or more examples. The processing system 100 may be configured similar to the computer system 700 of FIG. 7. In one example, the processing system 100 includes processor core 102 and memory 130. The processor core 102 is connected to the memory 130. In one example, the memory 130 is included within the processor core 102. The memory 130 may be referred to the primary memory. In one example, the memory 130 is connected to two or more processor cores 102.

The processing system 100 includes one or more integrated circuit (IC) chips. In one example, the processing system 100 includes one or more field programmable gate arrays (FPGAs) and/or application specific ICs (ASICS), among others. In one example, the processing system 100 is a system on chip (SoC).

The processor core 102 includes a processor 110. In one example, the processor 110 is a central processing unit (CPU). In another example, the processor 110 is a 32-bit or a 64-bit reduced instruction set computer (RISC) processor. In other examples, other types of processors may be used. For example, the processor 110 may be a digital signal processor (DSP). In one or more examples, the processor 110 may be configured similar to the processing device 702 of FIG. 7.

The processor core 102 further includes a memory 120. The memory 120 may be referred to as a secondary memory, such as a cache memory. For example, the memory 120 is a data cache memory. In one example, the memory 120 is a level one cache (e.g., primary cache or processor cache) memory that is part of the processor 110. In other example, the memory 120 is externally coupled to the processor 110. In one or more examples, the memory 120 has a size of one or more bytes. In one example, the memory 120 has a size of 16 kilobytes (KB), 32 KB, 64 KB, or more.

The memory 120 includes memory blocks (memory lines) 122 and control circuitry 124. The memory blocks 122 include one or more memory blocks. Each of the memory blocks 122 is able to store one or more bytes (words) of data. For example, the memory blocks 122 store data that is requested by the processor 110 from the memory 130. In one example, the memory blocks 122 are arranged in one or more sets (or rows). Each set includes one or more memory blocks 122. In one example, each set includes the same number of memory blocks 122, such that the memory blocks 122 are divided equally among the sets.

The data stored within memory blocks 122 is associated with metadata such that the data is locatable by the control circuitry 124. For example, each entry within the memory blocks 122 has an associated validity bit and tag bits. As is described in greater detail in the following, the validity bit indicates whether or not the data within a memory block is valid. The tag bits indicate where in the memory 130 the data stored within the memory blocks came from.

In one example, the memory 120 is a direct mapped memory, fully associative memory, or a set associative memory, among others. In a direct mapped memory, every block of the memory 130 is mapped to a block within the memory 120. In a fully associative memory, any block within the memory 130 is able to occupy any one of the memory blocks 122. In a set associative memory, the blocks within the memory 130 are mapped to one set of memory blocks 122 within the memory 120.

The control circuitry 124 is communicatively coupled to the processor 110, the memory blocks 122, and the memory 130. The control circuitry 124 receives memory transactions from the processor 110 and determines whether or not the data associated with the memory transactions is available within the memory blocks 122 (e.g., a cache hit), or not available within the memory blocks 122 (e.g., a cache miss). In an example where the data associated with a memory transaction is not available within the memory blocks 122, the control circuitry 124 outputs the memory transaction to the memory 130, requesting the data associated with the memory transaction from the memory 130.

The memory 130 is a memory external to the processor core 102. In one example, the memory 130 is shared among multiple processor cores 102. In one example, the memory 130 is larger than the memory 120. The memory 130 is configured similar to that of the main memory 704 of FIG. 7. The memory 130 includes memory blocks (e.g., memory lines) that are accessed by the processor 110 and stored within the memory blocks 122 of the memory 120.

Figure 2:
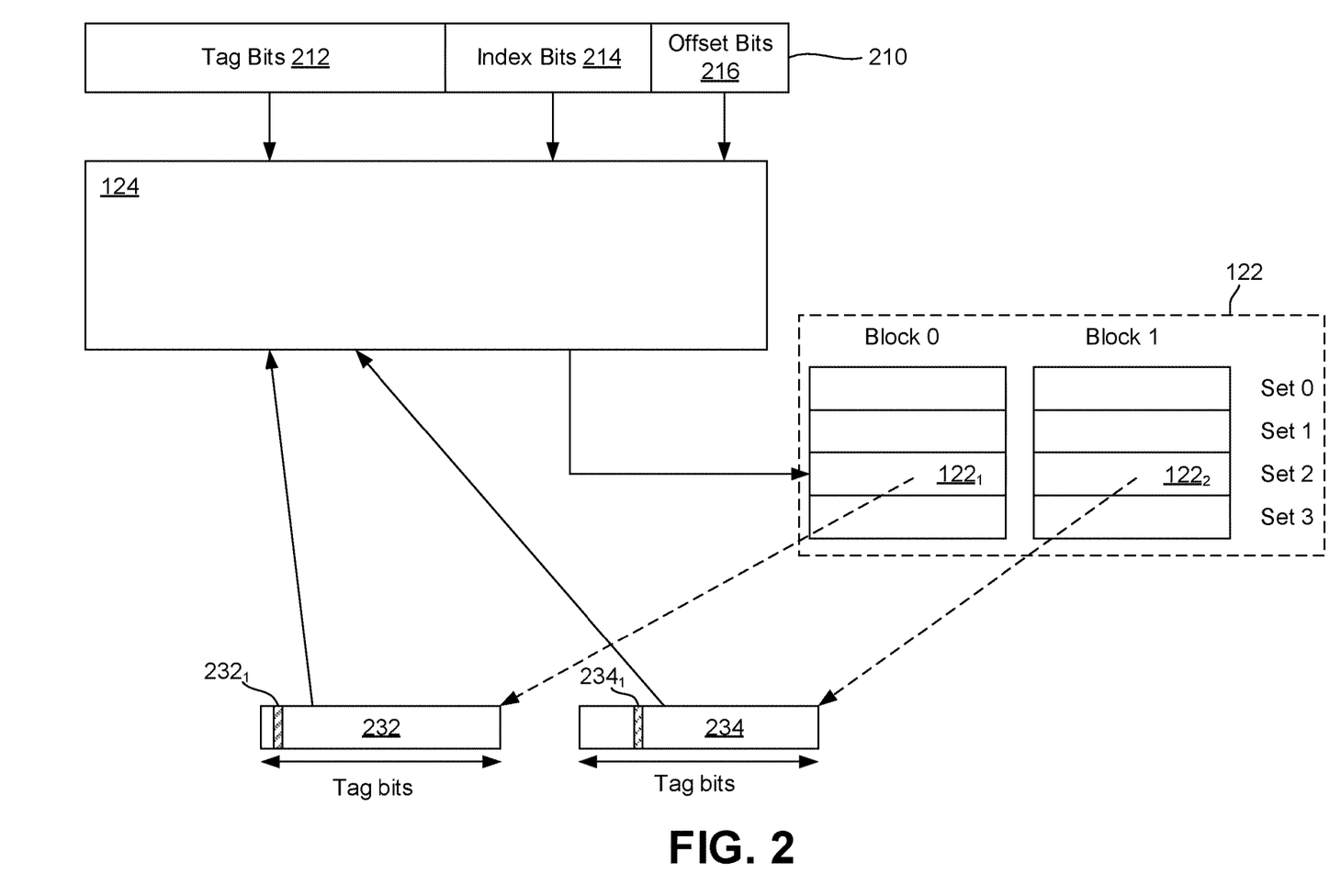
FIG. 2 illustrates a block diagram of a memory and a memory transaction request, according to one embodiment.

In the example of FIG. 2, the memory 120 is a direct mapped memory. In other examples, similar techniques may be applied to other types of memories. As illustrated in FIG. 2, the memory blocks 122 are organized into columns Block 0 and Block 1, and sets (rows) including Set 0, Set 1, Set, 2, and Set 3. In another example, the number of columns is greater than two, and/or the number of sets is greater than or less than four. The control circuitry 124 stores data obtained from the memory 130 within the memory blocks 122. To store the data, the control circuitry 124 determines a set to store the data based on one or more index bits within the address of the data. The address is divided into one or more tag bits (a tag field), and one or more index bits (an index field). In one example, the index bits are the same bits (e.g., bit position and number of bits) of the address for each entry within the memory blocks 122. The index bits of the address of the data is used to determine which row to store the one or more bits. The index portion may include the most significant bits (MSBs) of the address of the data, least significant bits (LSBs) of the address of the data, a middle portion of the address of the data, or another portion of the address of the data.

Each of the Set 0, Set 1, Set 2, and Set 3 is associated with a different index value. For example, Set 0 is associated with an index value of 0000, Set 1 is associated with 0001, Set 2 is associated with 0010, and Set 3 is associated with 0011. In other examples, other index values may be used associated with the sets.

Further, when storing data in the memory 120, the control circuitry 124 determines the tag bits of each address, and stores the tag bits within a tag field, or in another association, with each memory block 122 and/or Set 0-Set 3. The tag is part of the metadata for each entry within the memory blocks 122.

The tag bits indicate which subset of memory is stored in the corresponding memory block 122. The tag bits include one or more bits of the address of the data within the memory 130. In one example, the tag bits are the higher-order bits of an address of data within the memory 130 stored within the memory blocks 122. The tag bits include bits of the address not used as part of the index bits. Each entry within the memory blocks 122 is associated with different tag bits. In one example, the tag bits serve as a prefix for the data stored within a memory block 122. The tag bits allow for a memory block 122 to track where in the memory 130 the corresponding data came from.

In one or more examples, the metadata for each memory block 122 further includes a validity bit. The validity bit indicates whether or not a memory block 122 is storing or not storing data from the memory 130. A validity bit having a value of 1 indicates that a corresponding memory block 122 is storing data of the memory 130 and valid. A validity bit having a value of 0 indicates that a corresponding memory block 122 is not storing data from the memory 130 and is free. In other examples, other values may be used to indicate that the validity bit is either storing or not storing data from the memory. The validity bit may be stored within a validity bit field associated within each memory block 122.

The memory 120 receives a memory transaction request (e.g., the memory transaction request 210 of FIG. 2) from the processor 110. The memory transaction request 210 includes an address having the fields tag bits 212, index bits 214, and offset bits 216. The memory transaction request 210 may be either a read transaction (load transaction) or a write transaction (store transaction). The memory 120 uses the tag bits, the index bits, and offset bits to search the memory blocks 122 to determine whether or not the data associated with the memory transaction request 210 is stored within the memory blocks 122. In one example, the control circuitry 124 receives the memory transaction request 210. The control circuitry 124 partitions the bits of the memory transaction request 210 into the tag bits 212, the index bits 214, and the offset bits 216. The control circuitry 124 includes a reference for which bits of the memory transaction request 210 correspond to the tag bits 212, which bits of the memory transaction request 210 correspond to the index bits 214, and which bits of the memory transaction request 210 correspond to the offset bits 216.

In one example, the control circuitry 124 identifies a set of the memory blocks 122 based on the index bits 214. For example, the control circuitry 124 compares the index bits 214 to the index bits of each of the Set 0-Set 3 to determine which set corresponds to the memory transaction request 210. The control circuitry 124 selects the set associated with the matching index bits. The control circuitry 124 determines which of the memory blocks with the selected set have a validity bit of a value of 1 (e.g., the validity bit is set), and are associated with valid data (e.g., valid memory blocks). In one example, the validity bit is the MSB or LSB of the respective tag bits. The control circuitry 124 compares the tag bits, excluding the validity bit, of each of the valid memory blocks to the tag bits 212 to determine the memory block 122 storing data associated with the memory transaction request 210. The control circuitry 124 returns the data associated with the memory block 122 having tag bits that match the tag bits 212 (e.g., a memory hit or cache hit). The control circuitry 124 uses the offset bits 216 to identify the data to be returned. In an example where the control circuitry 124 determines that none of the valid memory blocks have tag bits that match the tag bits 212, or no memory blocks are valid, the control circuitry 124 requests the data associated with the memory transaction request 210 from the memory 130, and indicates a memory miss (or cache miss). When a memory miss occurs, the control circuitry 124 sends the memory transaction request 210 to the memory 130 to request the data from the memory 130. In the above example, the control circuitry 124 compares the tag bits 212 to the tag bits of each valid memory block. A comparator for each valid memory block is used to compare the tag bits. Accordingly, in an example where the number of memory blocks 122 per set is 16 or more, the processing power and processing time to find a matching memory block is intensive, reducing the performance of the processing system 100.

The processing power and processing time is reduced, improving the response time of the memory 120, but decreasing the number of comparisons performed between the tag bits 212 and the tag bits of the memory blocks 122. For example, as is described in greater detail in the following, hash bits for each entry in the memory blocks 122 are used to generate a hash value. The hash value is used to determine where the validity bit is located within the tag bits of each entry within the memory blocks 122. As compared to a process for storing data within memory blocks of a memory (e.g., the memory blocks 122 of the memory 120) that uses the MSB or LSB (or any constant bit location) as a validity bit, the present process as described below varies the location of the validity bit based of the hash value. Accordingly, the security of the memory 120 is increased, decreasing the ability for security threats from accessing the memory 120 and altering a valid state of a memory block 122.

The control circuitry 124 determines the hash bits for each entry with the memory blocks 122 when storing data from the memory 130 within the memory 120. In one example, each memory block 122 is associated with different hash bits. In another examples, the memory blocks 122 of each set are associated with the same hash bits, and the memory blocks 122 of different sets are associated with different hash bits. In another example, each memory block 122 of Block 0 is associated with first hash bits, and each memory block 122 of Block 1 is associated with second hash bits. The control circuitry 124 maintains a reference for the hash bits of each memory block 122, of each Set 0-Set 3, and/or for each of Block 0 and Block 1. In one example, the validity bit location for Set 0 is bit location 0, the validity bit location for Set 1 is bit location 1, the validity bit location for Set 2 is bit location 2, and the validity bit location for Set 3 is bit location 3. This configuration may be repeated for each additional grouping of four sets.

In one example, the number of hash bits is one or more. In another example, the number of hash bits is three or more or five or more. The number of hash bits corresponds to the memory size address (e.g., the number of bit of the address). For example, a larger number of bits may be used with larger address sizes to allow for more variation of the validity bit position. In one example, the number of hash bits is the same for each of the memory blocks 122, or at least one memory block 122 has a different number of has bits than another memory block 122. The control circuitry 124 maintains a reference or references for the number of hash bits for the memory blocks 122.

As is described above, N hash bits are used to determine the position of the validity bit within the tag bits of a memory address of data. The value of N is one or more. For N hash bits, the possible locations for the validity bit within the tag bits is $2^N$. In one or more examples, a M:1 multiplexer receives the validity bit values from each of the $2^N$ possible locations of the validity bits within the tag bits, and selectively outputs the validity bit values from each of the locations. The value of M is $2^N$. In one example, N is two. In such an example, there are four ($2^2$) possible locations of the validity bits within the tag bits. The locations have a binary value of 00, 01, 10, and 11. The locations may be in reference to the MSB, LSB, or some other bit locations within the tag bits. In an example where N is two, and the locations are determined with reference to the LSB, a 4:1 multiplexer receives a value from each of the possible validity bit locations, and selectively outputs the values. The multiplexer may sequentially output the values or output a selected one of the values based on a control signal generated from the hash value.

In one example, the control circuitry 124 selects the hash bits from the tag bits of an address when storing data within the memory blocks 122. The control circuitry 124 determines a hash value from the hash bits. Further, the control circuitry 124 stores the validity bit at a position within the tag bits based on the hash value. For example, for a hash value of five, the validity bit is stored at the fifth bit position within the corresponding tag bits. The fifth position may be from the LSB position or MSB position of the tag bits.

In one or more examples, the memory blocks 122 include 256 sets. For each entry within the memory blocks, eight bits are used for the index bits. Further, as the data size (e.g., line size) is 32 bytes, the offset bits include five bits. As the total address size is 64 bits, 51 bits are used for the tag bits (e.g., "64-8-5") plus one validity bit.

In one example, the tag bits for an entry (e.g., data) stored within a first memory block (e.g., the memory block 122₁) are 1111_0101. In such an example, the hash bits for the entry within the memory block 122₁ are the LSBs and the number of hash bits is three. Accordingly, the hash bits are 101. The control circuitry 122 determines the hash value by converting the binary value of the hash bits to a decimal value. For the binary value 101, the decimal value is five. Accordingly, the validity bit corresponds to the fifth bit position within the corresponding tag bits, starting from the LSB. For example, for tag bits of 1111_0101, the validity bit is stored at the fifth bit position or 1_11V1_0101, where V indicates the location of the validity bit within the tag bits. Accordingly, when storing data within the memory block 122₁, the control circuitry sets the validity bit accordingly. If the data within the memory block 122₁ is valid, the tag has a value of 1_1111_0101. If the data within the memory block 122₁ is invalid, the tag has a value of 1_1101_0101.

Further, the tag bits for an entry within a second memory block (e.g., the memory block 122₂) are 000_0110. The hash bits for the entry within the memory block 122₂ are the LSBs and the number of hash bits is three. Accordingly, the hash bits are 110. The control circuitry 124 determines the hash value corresponds to the decimal value of the binary value of the hash bits 110. For the binary value 110, the decimal value is six. Accordingly, the validity bit corresponds to the sixth bit position within the tag bits starting from the LSB. For example, for tag bits of 000_0110, the validity bit is stored at the sixth bit position or 0_0V00_0110. Accordingly, when storing data within the memory block 122₂, the control circuitry sets the validity bit accordingly. If the data within the memory block 122₂ is valid, the tag has a value of 0 0100 0110. If the data within the memory block 122₂ is invalid, the tag has a value of 0 0100 0110. The tag bits for the memory block 122₁ and 122₂ are stored within corresponding metadata with the location and number of hash bits.

In one example, the control circuitry 124 receives the memory transaction request 210, and partitions the memory transaction request 210 to determine the tag bits 212, the index bits 214 and offset bits 216. The control circuitry 124 determines the set of the memory blocks 122 based on the index bits 214. For example, the control circuitry 124 compares the index bits 214 with the index bits of each of Set 0, Set 1, Set 2, and Set 3. In one example, the control circuitry 124 determines that the index bits of the Set 2 match the index bits 214. The memory blocks 122₁ and 122₂ are determined to be associated with the memory transaction request 210. The entry within the memory block 122₁ has tag bits 232 and the entry within the memory block 122₂ has tag bits 234. The control circuitry 124 identifies the validity bit 232₁ within the tag bits 232 and the validity bit 234₁ within the tag bits 234 from the respective hash bits and hash value. The control circuitry 124 determines whether or not each of the validity bits 232₁ and 234₁ is set (e.g., has a value of 1). Further, the control circuitry 124 compares the hash bits of the tag bits 232 and 234 to the corresponding hash bits of the tag bits 212. Based on a determination the validity bit 232₁ is set, and that the hash bits of the tag bits 232 match the hash bits of the tag bits 212 (e.g., the hash bits are both 101), the tag bits 234, excluding the validity bit, are compared to the tag bits 212. Based on a match between the tag bits 234, data is obtained from the memory block 122₁ based on the offset bits 216. A similar process is performed for the tag bits 234 of the memory block 122₂.

In one example, the memory blocks 122₁ and 122₂ are analyzed as described above during an overlapping period of time, or during non-overlapping periods of time.

Figure 3:
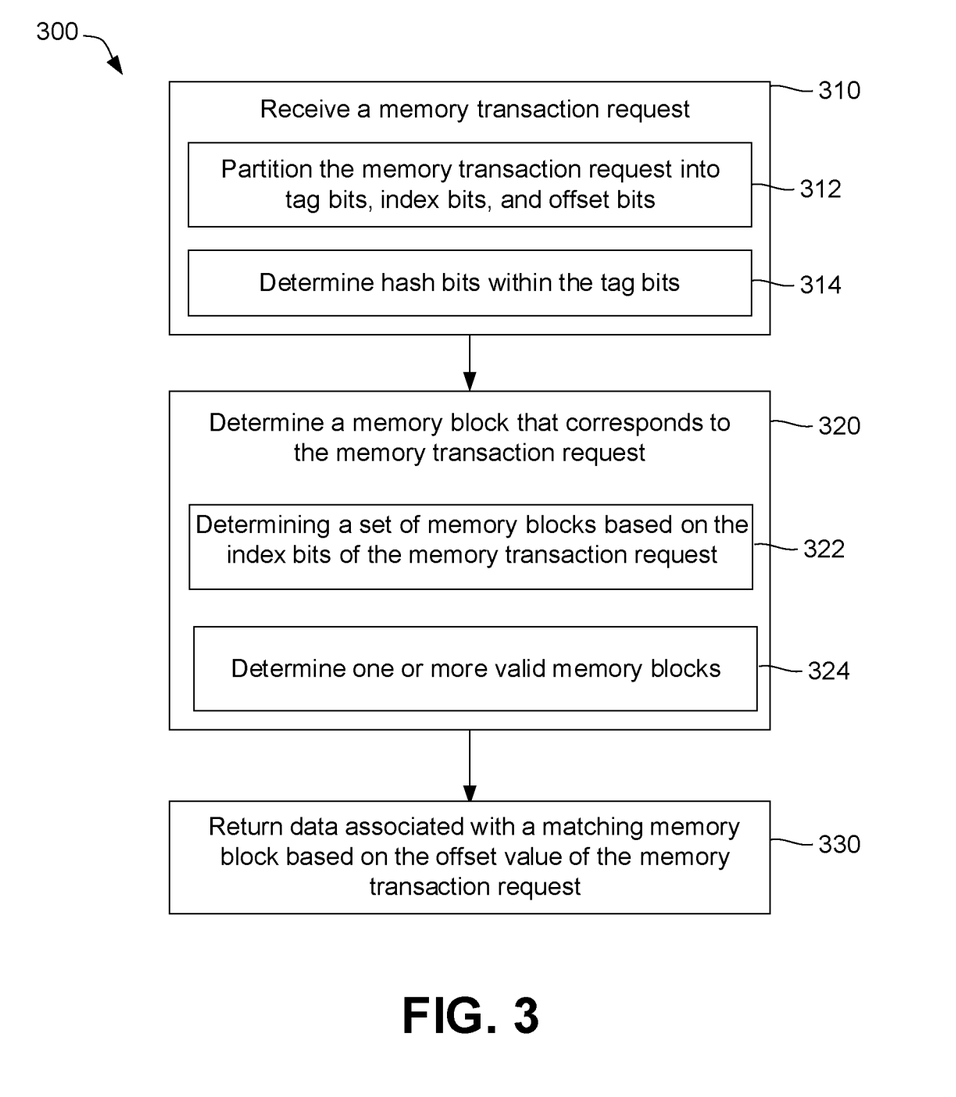
FIG. 3 illustrates a flowchart of a method for responding to a memory transaction request, according to one embodiment.

FIG. 3 illustrates a flowchart of a method 300 for responding to a memory transaction request by a memory, according to one or more examples. The method 300 may be performed by the control circuitry 124 of FIG. 1. In one example, the method 300 is completed during one cycle, e.g., at a rising edge of a clock signal driving the memory 120. In other examples, the method 300 is completed during one or more cycles, e.g., at one or more rising edges of a clock signal driving the memory 120.

At 310, a memory transaction request is received. For example, with reference to FIG. 2, the memory transaction request 210 is received by the control circuitry 124. In one example, receiving the memory transaction includes 312, partitioning the memory transaction request into tag bits, index bits, and offset bits. For example, with reference to FIG. 2, the control circuitry 124 partitions the memory transaction request 210 into the tag bits 212, the index bits 214, and the offset bits 216. In one example, the tag bits 212 are 1111_0101, the index bits are 0010, and the offset bits are 10. Further, receiving the memory transaction request includes at 314, determining hash bits within the tag bits. For example, with reference to FIG. 2, the control circuitry 124 determines the hash bits from within the tag bits 212. The control circuitry 124 determines the hash bits based on the location and number of hash bits used to determine the validity bits within memory blocks 122. In one example, the number of hash bits is three and the location is the LSBs of the tag bits 212. Accordingly, in an example where the tag bits 212 are 1111_0101, the hash bits are 101.

In an example, where the number and/or location of the hash bits vary from set to set, column to column, or memory block to memory block, for each variation, the control circuitry 124 determines different hash bits of the tag bits 212 for each variation.

At 320, a memory block that corresponds to the memory transaction request is determined. With reference to FIG. 2, the control circuitry 124 determines a memory block of the memory blocks 122 that corresponds to the memory transaction request 210. In one example, determining the memory blocks that correspond to the memory transaction request includes 322, determining a set of memory blocks based on the index bits of the memory transaction request. In one example, with reference to FIG. 2, the control circuitry 124 compares the index bits 214 to the index bits of each of the Sets 0-3. The control circuitry 124 determines that the index bits 0010 of the Set 2, including the memory blocks 122$_1$ and 122$_2$, matches the index bits 0010 of the memory transaction request 210. Further, in one example, determining the memory blocks that correspond to the memory transaction includes 324, determining one or more valid memory blocks. In one example, with reference to FIG. 2, the validity bits 232$_1$ and 234$_1$ of the tag bits 232 and 234 respectively are identified (determined) by the control circuitry 124. If the value of the validity bits 232$_1$ and 234$_1$ is 1, the corresponding entries within the memory blocks 122$_1$ and 122$_2$ are determined to be valid. If the value of the validity bits 232$_1$ and 234$_1$ is 0, the corresponding entries within the memory blocks 122$_1$ and 122$_2$ are determined to be invalid.

Figure 4:
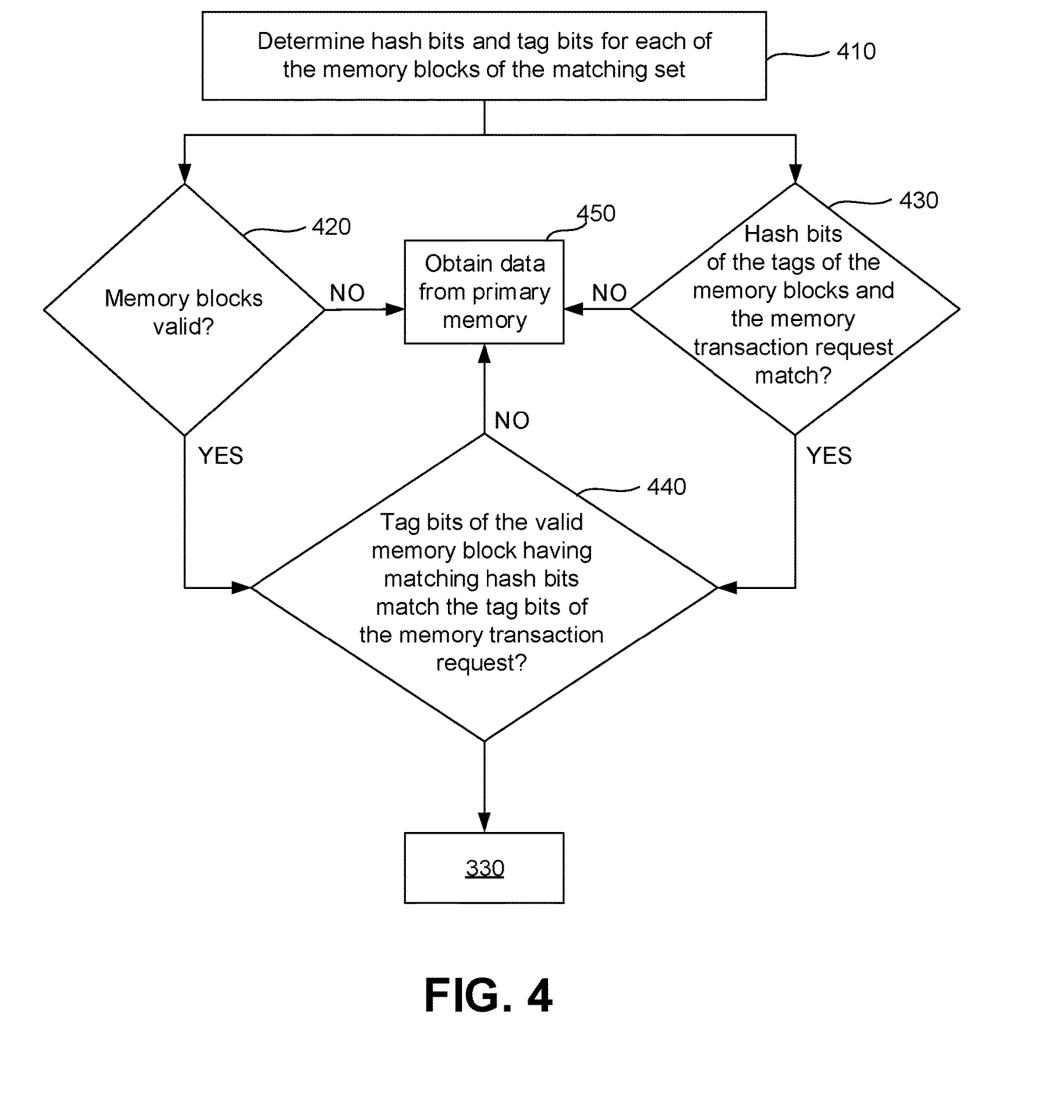
FIG. 4 illustrates a flowchart of a method for searching memory blocks based on a memory transaction request, according to one embodiment.

In one example, with reference to FIG. 4, determining one or more valid blocks at 324 further includes at 410 (referring to FIG. 4), determining hash bits and tag bits for entries within each of the memory blocks of the matching set. With reference to FIG. 2, the control circuitry 124 determines the validity bits 232$_1$ and 234$_1$, and the tag bits 232 and 234 for the entries within the memory blocks 122$_1$ and 122$_2$ of Set 3. Based on the reference maintained by the control circuitry 124, the hash bits of the tag bits 232 and 234 are determined to be the three LSBs of the tag bits 232 and 234. The tag bits 232, including the validity bit, are 1_1111_0101, accordingly, the hash bits are 101. The hash value is determined to be five (e.g., the binary value 101 as a decimal value). Accordingly, the validity bit is in the fifth bit position from the LSB. In the bit sequence 1_1111_0101, the validity bit has a value of 1, and is considered set. The tag bits 234, including the validity bit, are 0_0010_0110, accordingly, the hash bits are 110. The hash value is six (e.g., the binary value 110 in decimal). Accordingly, the value of the validity bit is in the sixth bit position from the LSB. In 0_0010_0110, the validity bit has a value of 1, and is set. The tag bits 232 and 234, with the validity bits 232$_1$ and 234$_1$ omitted, are determined. For example, the tag bits 232 are 1111_0101, and the tag bits 234 are 0000_0110.

At 420, the memory blocks are determined to be valid or invalid. In one example, a validity bit of 1 corresponds to a valid memory block (e.g., a valid entry within the memory block), and a validity bit of 0 correspond to an invalid memory block (e.g., an invalid entry within the memory block). In other examples, other values may be used to indicate valid and/or invalid memory blocks. As indicated above, the validity bits 232$_1$ and 234$_1$ of the memory blocks 122$_1$ and 122$_2$, respectively, have a value of 1 and are determined to be valid.

Further, determining one or more valid blocks at 324 includes at 430, determining if the hash bits of the tag bits of the memory blocks match the hash bits of the tag bits of the memory transaction request. With reference to FIG. 2, the control circuitry 124 compares the hash bits of the tag bits 232 and 234 with the hash bits of the tag bits 212, to determine if the hash bits of the tag bits 232 and/or the hash bits of the tag bits 234 match the hash bits of the tag bits 212. The tag bits 212 are 1111_0101. Accordingly, the hash bit is 101. The hash bits 101 of the tag bits 212 is compared to the hash bits 101 of the tag bits 232, and the hash bits 110 of the tag bits 234. The hash bits 101 of the tag bits 212 are determined to match the hash bit 101 of the tag bits 232. The hash bits 101 of the tag bits 212 are determined to not match the hash bits 110 of the tag bits 234.

In one example 420 and 430 may be performed during overlapping periods of time, or during non-overlapping periods of time.

In one or more examples, determining one or more valid blocks at 324 includes at 440, determining if the tag bits of the valid memory block having hash bits match the tag bits of the memory transaction. 440 is performed based on the outputs of 420 and 430 both being "Yes", such that one or more valid memory blocks are determined at 420, and a match between the hash bits of the tags of one or more memory blocks and the hash bits of the memory transaction is determined at 430. In one example, the control circuitry 124 compares the tag bits 234 of the memory block 122$_1$ with the tag bits 212.

At 330 of FIG. 3, based on determining that the tag bits 232 match the tag bits 212 (e.g., 1111_0101 of tag bits 232 match 1111_0101 of tag bits 212) at 440, data associated with the memory block 122$_1$ is returned based on the offset bits 216 of the memory transaction request 210.

If at 440, the tag bits 232 are not determined to match the tag bits 212, data associated from the memory transaction request 210 is obtained from a primary memory at 450. For example, with reference to FIG. 2, the control circuitry 124 outputs the memory transaction request 210 to the memory 130 of FIG. 1, requesting the corresponding data from the memory 130. The requested data is stored within the memory blocks 122 of the memory 120 as described above, and provided to the processor 110. For example, storing the requested data includes determining a position of the validity bit within the tag bits of the address of the data, setting the validity bit, and storing the data within a memory block of a corresponding set based on the index bits of the address.

In one example, at 420, if no memory blocks are determined to be valid, data associated from the memory transaction request 210 is obtained from a primary memory at 450. Further, at 430, if the hash bits of each of the memory blocks do not match the hash bits of the memory transaction, data associated from the memory transaction request 210 is obtained from a primary memory at 450.

As both 420 and 430 may proceed directly to 450, the method 300 may not complete the comparison of the tag bits of the valid memory blocks with that of the memory transaction if the outcome of either of 420 or 430 is "no", decreasing the amount of processing resources used by the memory 120. Further, as the tag bits of the memory blocks that both include valid data and have hash bits that match the hash bits of the memory transaction are used in comparison of 440, the number of total comparisons is reduced, decreasing the processing resources used by the memory 120.

In one or more examples, 450 of FIG. 4 includes invalidating the validity bit location or locations within the tag bits. In one example, each of the possible validity bit locations are invalidated. For example, the validity bit location or locations are updated with a value of 0. As is described above, the location of the validity bit within the corresponding tag bits correspond to a hash value determined from hash bits. The hash value is the decimal value of the binary value of the hash bits. In an example, where the number of hash bits is two, the total possible locations is four (e.g., $2^2$). For example, the locations correspond to binary values 00, 01, 10, and 11. The locations may be defined based on the LSB, MSB, or some other selected bit location within the tag bits. In one example, for a memory block that is determined to be invalid at 420, each of the possible validity bit locations is updated with an invalid value. Based on the above example, each of the validity bit locations associated with the binary values 00, 01, 10, and 11 are updated to have a bit value of zero. In an example where there are M locations, each of the M validity bit locations are updated to have a bit value of zero based the corresponding memory block being determined to be invalid at 420.

In the above example, method 300 is described with regard to a direct mapped memory structure. However, in other examples, the method 300 may be applied to other types of memory structures.

Figure 5:
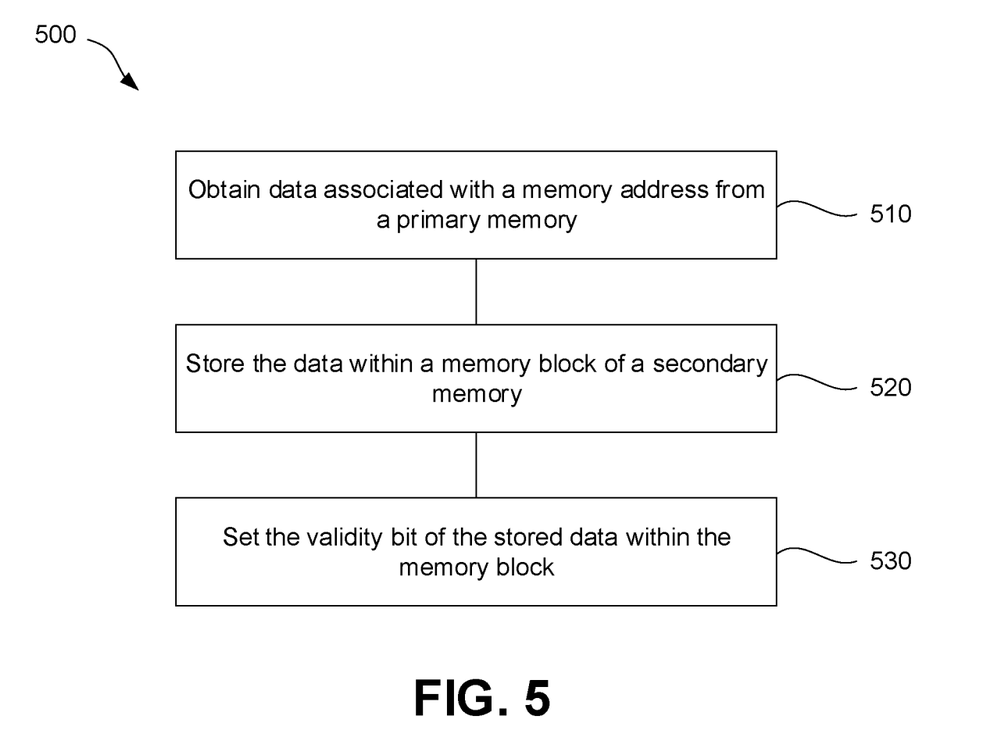
FIG. 5 illustrates a flowchart for storing data in a memory, according to one embodiment.

FIG. 5 illustrates a flowchart of a method 500 for storing data in a memory, according to one or more examples. In one example, the method 500 is performed by the control circuitry 124 to store data obtained from the memory 130 within the memory blocks 122. In one example, the method 500 is performed based on a determination at 450 of FIG. 4, that the data requested by the processor 110 is not present within the memory 120.

At 510, data associated with a memory address is obtained from a primary memory. The memory address is received as part of a memory transaction from a processor. In one example with reference to FIGS. 1 and 2, the memory transaction request 210 is output to the memory 130, and the memory 130 responds with corresponding data. The data is received by the control circuitry 124 from the memory 130.

At 520, the data is stored within a memory block of a secondary memory. In one example with reference to FIG. 2, the control circuitry 124 determines one of the Sets 0-3 to store the data. The control circuitry 124 selects one of the Sets 0-3 based on index bits within the memory address of the data. The each of the Sets 0-3 corresponds to different index bits, and the control circuitry 124 selects the one of the Sets 0-3 that has matching index bits. The control circuitry 124 stores the data within one of the open (e.g., empty) memory blocks 122 within the selected set.

At 530, the validity bit of the data stored within the memory block is set. As is described above, the address of the stored data includes tag bits. With reference to FIG. 2, the control circuitry 124 determines a hash value from one or more of the tag bits (e.g., hash bits). In one example, one or more LSBs, one or more MSBs, and/or one or more other bits of the tag bits are selected and used as the hash bits. As is described above, the hash bits are used to generate a hash value. The hash bits are converted to a decimal value (e.g., hash value), which is used to position the validity bit within the tag bits. For example, for hash bits 101, the decimal value is five. Accordingly, the validity bit is placed at the fifth bit position within the tag bits. The fifth bit position can be from the LSB or MSB of the tag bits. The validity bit at the determined position is set and added to the tag bits. Setting the validity bit includes setting a value of the validity bit to be 1, indicating that the data within the corresponding memory block is valid. In other examples, other values may be used to indicate that the data is valid. The tag bits, including the validity bit, are stored along with the data as corresponding metadata.

In one example, by varying the number of validity bits that are used to determine the hash value, the value that the hash value can be is increased or decreased. Further, in one or more examples, the hash bits used to generate the hash value for a memory block is maintained by the control circuitry 124. Further, as the hash value is based on bits within the tag bits of a memory address associated with data stored within a memory block, the location of the validity bit differs between at least two memory blocks. Further, the location of the validity bit is not static, e.g., the same for each memory block. By determining the location, e.g., position, of the validity bit based on a hash value determined from hash bits, the security of the validity bit is increased.

FIG. 1, FIG. 2, FIG. 3, FIG. 4, and FIG. 5 are directed at determining a validity bit location based on a hash value of tag bits of a memory address. In other examples, similar techniques may be used to determine the location of a permission bit or bits. In one example, a permission bit may correspond to read only access or write access, among others. In one example, a memory block is set to have read only access. Accordingly, a hash value may be determined as described above to determine the location to place the read only access bit within the tag bits of the memory address of a memory block. Based on determining the location, the read only access bit is set at corresponding location. Similar approaches may be applied to other permissions.

Figure 6:
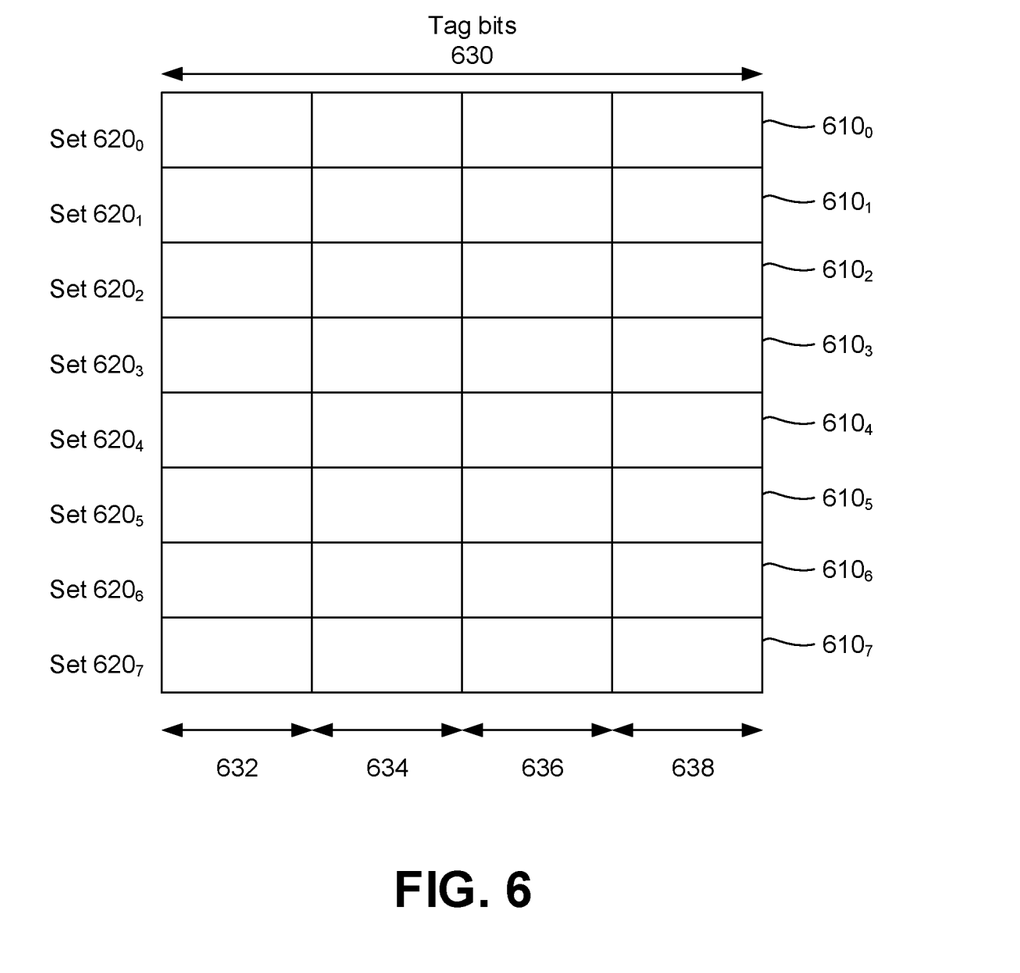
FIG. 6 illustrates an example of assigning validity bits to sets of memory blocks, according to one embodiment.

FIG. 6 illustrates memory blocks $610_0$-$610_7$ associated with Sets 620. In the example of FIG. 6, multi-level hashing is used to determine the position of the validity bit within the tag bits 630 of each memory block 610. The tag bits 630 are grouped into groups 632, 634, 636, and 638. An index value is used by the control circuitry 124 of FIG. 1 to select one of the groups 632, 634, 636, and 638 to insert the validity bit. The selected group may be the same for all of the sets 620. In another example, the selected group for a first set 620 differs from the selected group of a second set 620. The control circuitry 124 maintains a reference that indicates which group is associated with each respective set 620. Further, the control circuitry 124 uses one or more tag bits 630 of each memory block 610 to determine a hash value and the position of the validity bit within the selected group. The control circuitry 124 may use one or more MSBs, one or more LSBs, or any other bits with the tag bits 630 of the memory blocks 610 to determine the hash value and position of the validity bit. In one example, the control circuitry 124 maintains a reference of the bits (e.g., hash bits) used to determine the hash value. Multi-level hashing as described with regard to FIG. 6 may be applied to the examples of FIG. 2, FIG. 3, FIG. 4, and FIG. 5 above.

Figure 7:
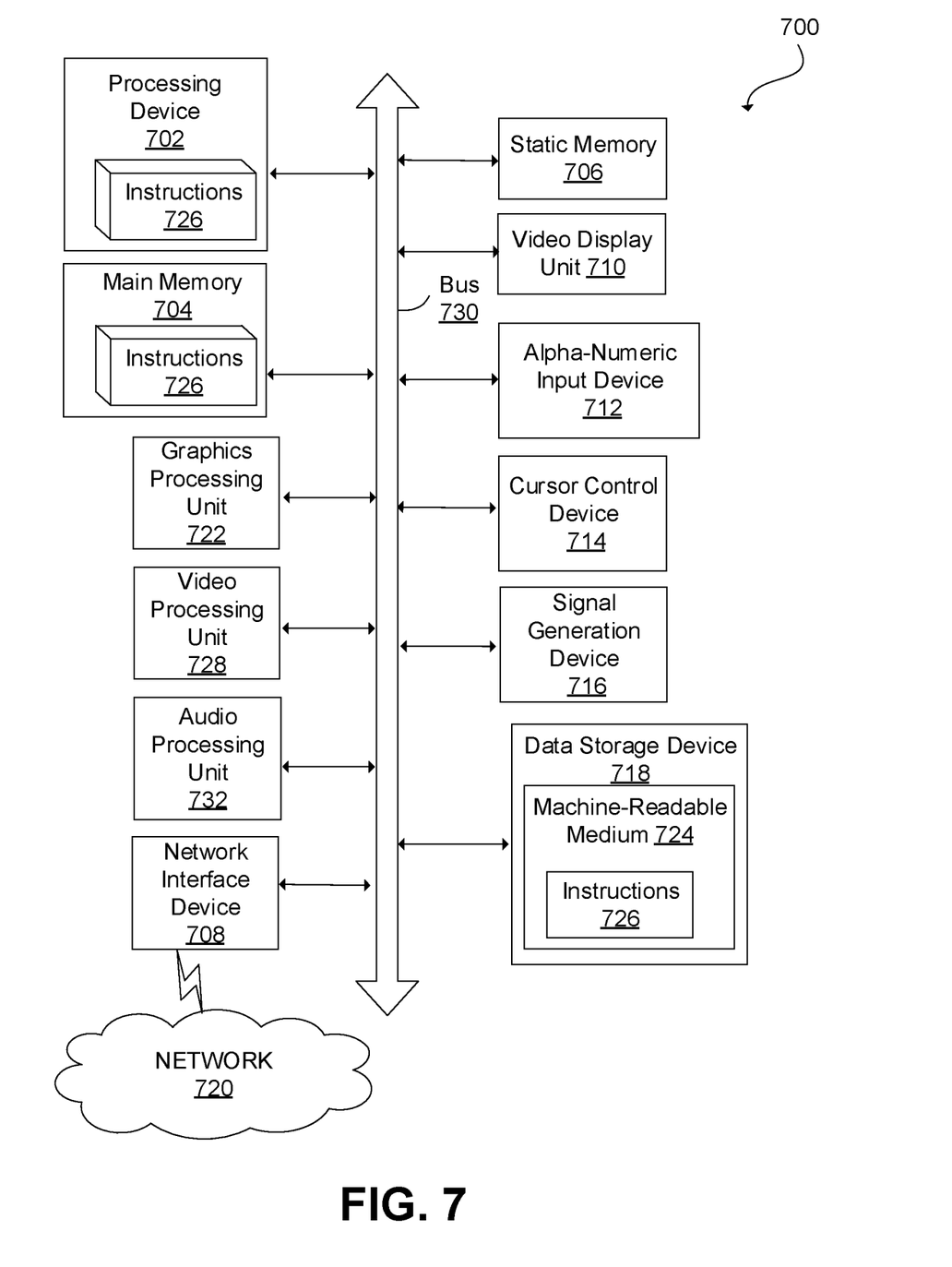
FIG. 7 depicts a diagram of an example computer system in which embodiments of the present disclosure may operate.

In one example, two multiplexers may be used by the control circuitry 124 of FIG. 1 to acquire the validity bits from the memory blocks 610 of the sets 620. A first multiplexer is has T inputs connected to the T groups within the T bit groups (e.g., groups 632-638) within the tag bits 630. T is one or more. The first multiplexer is a T:1 multiplexer. A second multiplexer is connected to each possible value bit locations within each of the groups. The second multiplexer has Z inputs, e.g., an input for each of the possible validity bit locations. Z is one or more. The second multiplexer is a Z:1 multiplexer. The first multiplexer selects from one of the groups 632-638, and the second multiplexer selects one of the validity bits from the selected group. validity bit FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
receiving a memory transaction request from a processing device;
comparing, via control circuitry, first hash bits of the memory transaction request with second hash bits of a first memory block of a memory; and
outputting data associated with the first memory block to the processing device based on a validity bit associated with the second hash bits and the comparison of the first hash bits with the second hash bits.

2. The method of claim 1, wherein the second hash bits are within tag bits of the first memory block and the validity bit is included within the tag bits, and wherein the method further comprises:
determining a hash value from the second hash bits, and
determining that the validity bit of the tag bits is set based on the hash value, wherein a position of the validity bit within the tag bits corresponds to the hash value.

3. The method of claim 2, further comprising:
comparing tag bits of the memory transaction request with the tag bits of the first memory block based on determining that the validity bit is set and the comparison of the first hash bits and the second hash bits.

4. The method of claim 3, further comprising:
determining that the first hash bits and third hash bits of a second memory block of the memory are nonmatching, wherein data is obtained from a primary memory based on determining that the first hash bits and the second hash bits are nonmatching.

5. The method of claim 1, wherein the first hash bits and the second hash bits include two or more bits, wherein bits of the first hash bits and bits of the second hash bits are the same.

6. The method of claim 1, wherein a position of the first hash bits within tag bits of the memory transaction request and a position of the second hash bits within tag bits of the first memory block are the same.

7. The method of claim 1 further comprising:
storing data within the first memory block by:
determining a hash value from the second hash bits; and
setting the validity bit within tag bits of the first memory block to a value of one, wherein a position of the validity bit corresponds to the hash value.

8. A system comprising:
a processing device; and
a memory comprising memory blocks, the memory configured to:
receive a memory transaction request from the processing device;
compare first hash bits of the memory transaction request with second hash bits of a first memory block of the memory blocks of the memory; and
output data associated with the first memory block based on a validity bit associated with the second hash bits and the comparison of the first hash bits with the second hash bits to the processing device.

9. The system of claim 8, wherein the second hash bits are within tag bits of the first memory block and the validity bit is included within the tag bits, and wherein the memory is further configured to:
determine a hash value from the second hash bits, and
determine that the validity bit of the tag bits is set based on the hash value, wherein a position of the validity bit within the tag bits corresponds to the hash value.

10. The system of claim 9, wherein the memory is further configured to:
compare tag bits of the memory transaction request with the tag bits of the first memory block based on determining that the validity bit is set and the comparison of the first hash bits and the second hash bits.

11. The system of claim 10, wherein the memory is further configured to:
determine that the first hash bits and third hash bits of a second memory block of the memory are nonmatching, wherein data is obtained from a primary memory based on determining that the first hash bits and the second hash bits are nonmatching.

12. The system of claim 8, wherein the first hash bits and the second hash bits include two or more bits, wherein bits of the first hash bits and bits of the second hash bits are the same.

13. The system of claim 8, wherein a position of the first hash bits within tag bits of the memory transaction request and a position of the second hash bits within tag bits of the first memory block are the same.

14. The system of claim 8, wherein the memory is further configured to:
store data within the first memory block by:
determining a hash value from the second hash bits; and
setting the validity bit within tag bits of the first memory block to a value of one, a position of the validity bit corresponds to the hash value.

15. A memory comprising:
memory blocks; and
control circuitry configured to:
obtain data from a primary memory, the data associated with an address:
determine a hash value from first hash bits of the address;
set a validity bit within tag bits of the address to a valid value, a position of the validity bit corresponds to the hash value; and
store the data within a first memory block of the memory blocks.

16. The memory of claim 15, wherein the control circuitry is further configured to:

receive a memory transaction request from a processing device;
   compare second hash bits of the memory transaction request with the first hash bits; and
   output data associated with the first memory block based on the comparison of the first hash bits with the second hash bits to the processing device.

17. The memory of claim 16, wherein the memory is further configured to:
   compare tag bits of the memory transaction request with the tag bits of the address based on determining that the validity bit is set and the comparison of the first hash bits and the second hash bits.

18. The memory of claim 16, wherein the first hash bits and the second hash bits include two or more bits, wherein bits of the first hash bits and bits of the second hash bits are the same.

19. The memory of claim 16, wherein a position of the first hash bits within tag bits of the address and a position of the second hash bits within tag bits of the memory transaction request are the same.

20. The memory of claim 16 further configured to:
   determine that the second hash bits and third hash bits of a second memory block of the memory blocks are nonmatching, wherein data is obtained from the primary memory based on determining that the first hash bits and the second hash bits are nonmatching.

* * * * *